United States Patent
Kotecha et al.

(10) Patent No.: US 10,212,193 B2
(45) Date of Patent: Feb. 19, 2019

(54) SERVICE SUPPORT FOR SUSPENDED AND INACTIVE SUBSCRIBERS

(71) Applicant: Verizon Patent and Licensing Inc., Arlington, VA (US)

(72) Inventors: Lalit R. Kotecha, San Ramon, CA (US); Sudhakar Reddy Patil, Flower Mound, TX (US); Praveen Gupta, Dublin, CA (US); Andrew J. Dock, Livingston, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 194 days.

(21) Appl. No.: 15/154,081

(22) Filed: May 13, 2016

(65) Prior Publication Data

US 2017/0331861 A1 Nov. 16, 2017

(51) Int. Cl.
*H04L 29/06* (2006.01)
*H04L 29/08* (2006.01)

(52) U.S. Cl.
CPC ...... *H04L 65/1066* (2013.01); *H04L 65/1016* (2013.01); *H04L 65/1046* (2013.01); *H04L 65/1063* (2013.01); *H04L 65/1073* (2013.01); *H04L 67/306* (2013.01)

(58) Field of Classification Search
CPC ............. H04L 65/1016; H04L 65/1046; H04L 65/1063; H04L 65/1066; H04L 65/1073; H04L 67/306
See application file for complete search history.

(56) References Cited

U.S. PATENT DOCUMENTS

| | | | |
|---|---|---|---|
| 2005/0190772 A1* | 9/2005 | Tsai | H04W 4/00 370/395.52 |
| 2007/0067470 A1* | 3/2007 | Ayers | H04L 67/16 709/230 |
| 2007/0088836 A1* | 4/2007 | Tai | H04M 7/128 709/227 |
| 2008/0137686 A1* | 6/2008 | Agarwal | H04W 4/02 370/474 |
| 2008/0273704 A1* | 11/2008 | Norrman | H04L 63/062 380/278 |
| 2009/0073964 A1* | 3/2009 | Milinski | H04L 29/06027 370/352 |

(Continued)

*Primary Examiner* — Rina C Pancholi

(57) ABSTRACT

A method may include receiving, at a serving call session control function (S-CSCF) device, from a home subscriber server (HSS), a subscriber profile that includes a first subscription state associated with a user device. The first subscription state is one of a plurality of subscription states in addition to barred and not barred. The method includes routing messages to at least one of a plurality of application server devices based on at least one initial filter criteria (iFC) associated with the first subscription state. The method also includes receiving, at the S-CSCF device and from the HSS, a subscription state change to a second subscription state from the HSS, wherein the second subscription state is one of the plurality of subscription states. The method further includes identifying at least one iFC associated with the second subscription state, and routing messages to at least one of the plurality of application servers based on the at least one iFC associated with the second subscription state.

20 Claims, 9 Drawing Sheets

(56) References Cited

U.S. PATENT DOCUMENTS

| | | | | |
|---|---|---|---|---|
| 2009/0122794 A1* | 5/2009 | Wu | ............... | H04W 8/20 |
| | | | | 370/352 |
| 2010/0124199 A1* | 5/2010 | Shi | ............... | H04L 65/1073 |
| | | | | 370/329 |
| 2011/0111734 A1* | 5/2011 | Walker | ............... | H04L 67/16 |
| | | | | 455/414.1 |

* cited by examiner

SERVICE SUPPORT FOR SUSPENDED AND INACTIVE SUBSCRIBERS

BACKGROUND INFORMATION

Telephone calls are often placed across networks for different telephone companies or service providers. Call origination is the initiation, by a calling party, of a telephone call in a provider network. Call termination is the routing of the telephone call from the provider network to a called party in the same or another provider network. The called party is usually identified by a public user identifier (ID), such as a telephone number.

Third generation partnership project (3GPP) Internet protocol (IP) multimedia system (IMS) currently supports two states for a subscriber provisioned within a home subscriber server (HSS). These states are: barred and not barred. If a subscriber (public identity) is barred (e.g., because of payment delinquency or becoming inactive), the IMS may require that the IMS core (e.g., serving call state control function (S-CSCF) devices) prevent that public identity from being used in any IMS communication except for registration and re-registrations. However, non-emergency access may be required in the barred state. Current applications use application servers to maintain awareness of subscription state, to provide non-emergency access and to restrict services, etc.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may allow for the definition and usage of subscription states with initial filter criterias (iFCs) so that service point triggers and application sever addresses may be initially configured for different subscription states. The different subscription states may include suspended, dormant, inactive, etc. In instances in which a subscriber's state changes, the subscription state information may be propagated to serving call state control function (S-CSCF) servers) and any subsequent service access may be based on the iFCs that take into consideration the particular subscription state.

Consistent with embodiments, the systems and methods may allow processing of different iFCs when subscription state changes. In instances when subscription state changes for a particular subscriber, appropriate iFCs for the subscription state may be re-provisioned for that subscriber and public identity will be in "Not Barred" state. The iFC definitions may be used to divert service traffic to specific application servers depending on subscription state.

Figure 1:
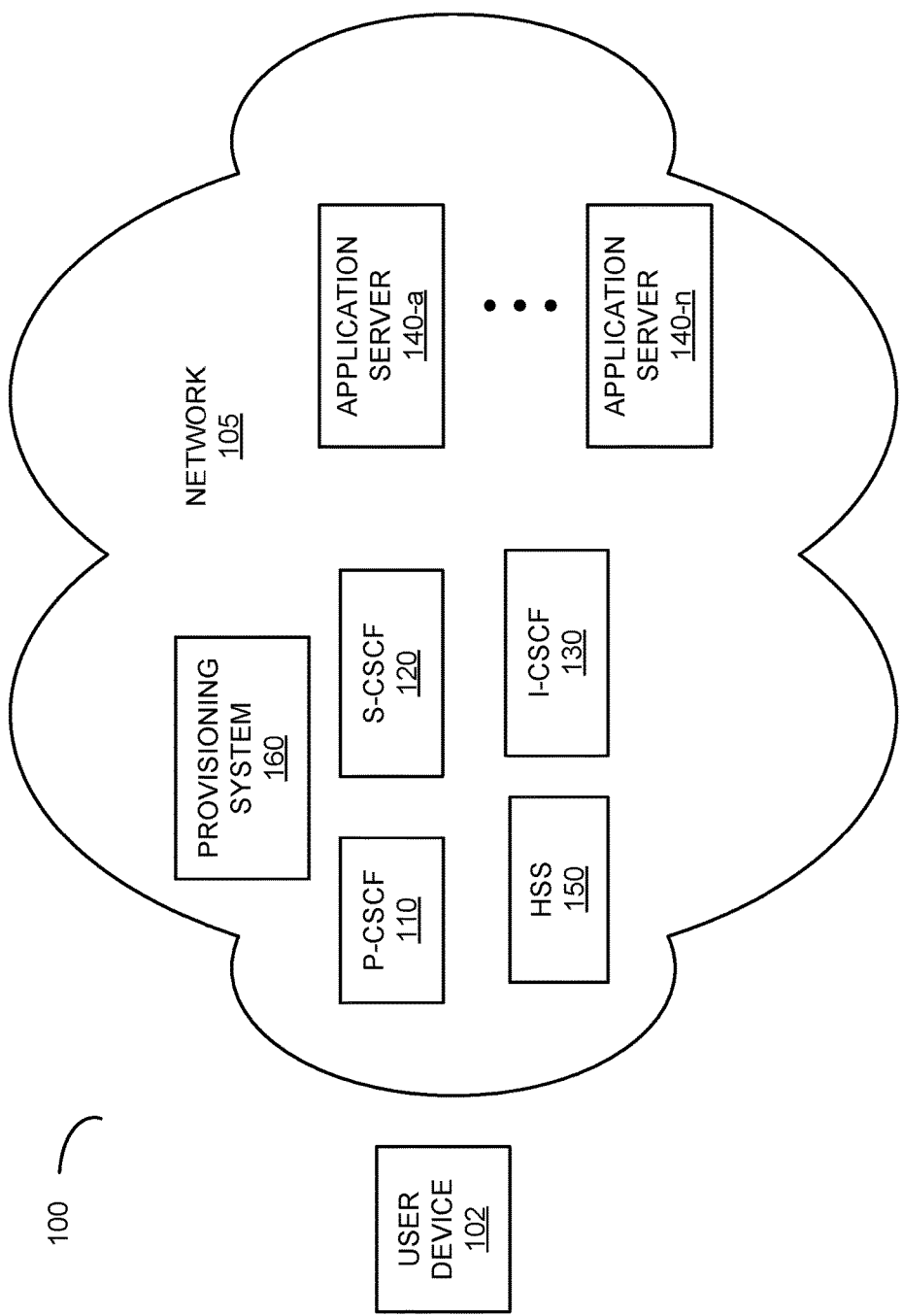
FIG. 1 illustrates an exemplary network in which systems and methods described herein may be implemented.

FIG. 1 is a block diagram of an exemplary environment 100 in which systems and methods described herein may be implemented. Environment 100 may include a network 105 and a user device 102. In an exemplary implementation, network 105 may represent a network associated with a service provider that provides various services, such as Internet-protocol (IP) related services, value added services, etc. For example, in one implementation, network 105 may represent an Internet-protocol Multimedia Subsystem (IMS) network that provides services to IMS subscribers (referred to herein as subscribers). Network 105 may include proxy call session control function (P-CSCF) device 110, serving call session control function (S-CSCF) device 120, and interrogating call session control function (I-CSCF) device 130. Network 105 may also include application servers 140-a to 140-n (collectively referred to as application servers 140 or individually as application server 140) and a home subscriber server (HSS) 150.

The exemplary configuration illustrated in FIG. 1 is provided for simplicity. It should be understood that a typical environment may include more or fewer components than illustrated in FIG. 1. For example, although a single user device 102 is shown, environment 100 may include large numbers of user devices 102 (e.g., thousands or millions of user devices 102). Additionally, environment 100 may include a number of other networks.

Devices in environment 100 may be adapted to provide, receive and process additional subscription states within iFCs (or iFCs within a subscription state) and allow triggers and application sever addresses to be initially configured for the additional subscription states. The iFC is an extensible markup language (XML)-based IMS standard used to define the order that the provisioning system (or an orchestrating entity, such as an orchestration engine) routes a session across application servers 140-a to 140-n.

User device 102 (referred to singularly as user device 102, in plural as user devices 102 or generally as user devices 102) may include any type of device that is able to transmit and receive data, such as text data, video data, image data, audio data, multi-media data, etc. For example, user devices 102 may include some type of computer, such as a personal computer (PC), a tablet computer, a laptop computer, etc., a personal digital assistant (PDA), a web-based appliance, a mobile terminal (e.g., a cellular telephone), etc. User devices 102 may also include a telephone, such as a public switched telephone network (PSTN) based telephone, an Internet-protocol (IP) based phone, a wireless telephone, etc., used to make and receive telephone calls. User device 102 may be a subscriber to telephony services provided in association with network 105.

Network 105 may include one or more wired, wireless and/or optical networks that are capable of receiving and transmitting data, voice and/or video signals, including multi-media signals that may include voice, data and video information. For example, network 105 may include one or more public switched telephone networks (PSTNs) or other type of switched network. Network 105 may include a voice over long term evolution (VoLTE) network. Network 105 may also include one or more wireless networks and may include a number of transmission towers for receiving wireless signals and forwarding the wireless signals toward the intended destinations. Network 105 may further include one or more satellite networks, one or more packet switched networks, such as an IP-based network, a local area network (LAN), a wide area network (WAN), a personal area network (PAN) (e.g., a wireless PAN), an intranet, the Internet, or another type of network that is capable of transmitting data. Network 105 may include call session control components (i.e., P-CSCF 110, S-CSCF 120, and I-CSCF 130) used to process calls in network 105 (e.g., calls to/from IMS subscribers).

P-CSCF 110, S-CSCF 120, and I-CSCF 130 may perform session control processing and may be responsible for parsing a session (e.g., a session initiation protocol (SIP) session) and applying logic (e.g., business logic, service logic, operational logic, etc.) on a per call/session or per event basis. The outcome of the session control processing may be to route call/session to the appropriate network elements (e.g., application server 140) inside or outside of network 105 and/or manipulate SIP headers and values of the SIP signaling messages.

P-CSCF 110 may store the address (such as a packet data network (PDN) gateway (PGW) address and an IP address of user device 102) so that the IMS network can reach each user device 102 individually. P-CSCF 110 may act as the main point of contact for connections to user devices (not shown in FIG. 1) associated with subscribers of the IMS (referred to herein as subscribers or IMS subscribers). For example, P-CSCF 110 may validate requests from user devices 102, forward the requests to selected destinations, process and forward the responses, etc. P-CSCF 110 may also generate chargeable events and send information relating to the chargeable events to a billing system (not shown).

S-CSCF 120 may perform session control and registration services for user devices 102 of the IMS network/platform (e.g., network 105). S-CSCF 120 may receive a user profile from another network element, such as HSS 150 and route sessions requested by a subscriber (e.g., user device 102). Additionally, S-CSCF 120 may perform user authentication for subscribers. S-CSCF may also generate charging data for a call/session or event.

I-CSCF 130 may act as a main point of contact for connections to subscribers (user devices 102) served by other networks, such as other IP networks (e.g., a network external to network 105). I-CSCF 130 may function to identify the S-CSCF 120 that serves the called party. I-CSCF 130 may perform this function for both internally generated calls (e.g., subscriber calls) and for externally generated calls (e.g., non-subscriber calls). For example, S-CSCF 120 may receive a subscriber call forwarded via P-CSCF 110, generate a number mapping query, such as an E.164 number mapping (ENUM, as defined by the International Telecommunication Union (ITU)) query to an ENUM server (not shown), and receive a response identifying a particular I-CSCF 130 for the called user. S-CSCF 120 that serves the calling user may forward the call to the identified I-CSCF 130 that serves the called user. If HSS 150 is available, I-CSCF 130 may perform an HSS query and identify, for example, S-CSCF 120 as the CSCF component serving the called party and forward the call to S-CSCF 120.

In an exemplary implementation, P-CSCF 110, S-CSCF 120 and I-CSCF 130 may be implemented in a single device. Alternatively, P-CSCF 110, S-CSCF 120, and I-CSCF 130 may be implemented using separate network elements/devices. In one implementation, S-CSCF 120 may be viewed as the "brain" (i.e., a central decision making/processing point (or server) in network 105) of the call session control components (i.e., P-CSCF 110, S-CSCF 120 and I-CSCF 130). The call session control components may also interact with HSS 150 and/or other elements associated with providing IMS related services.

Application server 140 may be a network element or server (or application, group of servers, etc.), such as a telephony application server (TAS), short message service center (SMSC), chat server, etc., which implements applications for a subscriber in network 105. For example, application server 140 may perform call processing associated with calls from subscribers, such as a subscriber associated with user device 102. Application server 140 may perform one or more lookups to identify information associated with routing calls based on the location of the caller. Application server 140 may perform supplemental/additional services, such as functions indirectly related to call or message routing in network 105 (e.g., video voicemail, text messaging, etc.).

Application servers 140 may provide appropriate protocol support for subscription-state processing. Different application servers 140 may handle different services in network 105. Application servers 140 may send protocol compliant error/response messages back to user devices 102 based on subscription state. Application servers 140 may be designed and execute functionality that extends capabilities described in current Third generation partnership project (3GPP) standards/design documents to provide support for subscription state processing.

HSS 150 may include a master user database that supports network elements that handle calls, such as application server, call session call control function, proxy devices, session border controllers, etc. HSS 150 may contain subscription-related information (e.g., subscriber profiles), and may perform authentication and authorization of a user device 102 based on requests received from an associated device, such as a mobile management entity (not shown, e.g., a key control node responsible for idle mode tracking and paging procedure in a long term evolution (LTE) network) or application server 140. HSS 150 may provide information about a network location and Internet protocol (IP) address of user devices 102 to other devices in network 105.

Provisioning system 160 may include a network element that provides provisioning information for various data flows associated with user devices 102. Provisioning system 160 may provide information identifying data flows for an infotainment service for a particular mobile data number (MDN). The data flows may be transmitted and received over a particular set of ports based on a particular port arrangement.

It should be understood that network 105 may include additional elements that aid in routing calls and providing services to customers. In addition, functions described as being performed by one of the elements in FIG. 1 may alternatively be performed by another element or multiple elements. In addition, although the various devices illustrated in FIG. 1 are shown as separate devices, in other implementations, the functions performed by two or more of these network elements may be performed by a single network element or platform. Still further, additional connections (not shown) between the components of FIG. 1 may exist. Network 105 may also include additional elements, such as switches, routers, gateways, backend systems, etc., that aid in routing calls and/or session information in network 105 and providing services to parties associated with user devices 102.

Implementations described herein relate to providing subscription states within iFCs or iFCs within subscription-state so that triggers and iFC processing logic may be initially configured for additional subscription states. Each of the additional states may allow conditional non-emergency service access in addition to emergency service access. The systems may provide support for additional subscription states apart from barred and not-barred and may specify and store information regarding the subscription states in HSS 150 at a public identity level. The subscription state enumerations may include (but are not limited to) suspended, limited support, dormant, etc. In instances in which a subscriber's subscription state changes, the subscription state information may be propagated to S-CSCFs 120 and any subsequent service access may be based on the iFCs that take into consideration the particular subscription state.

Figure 2:
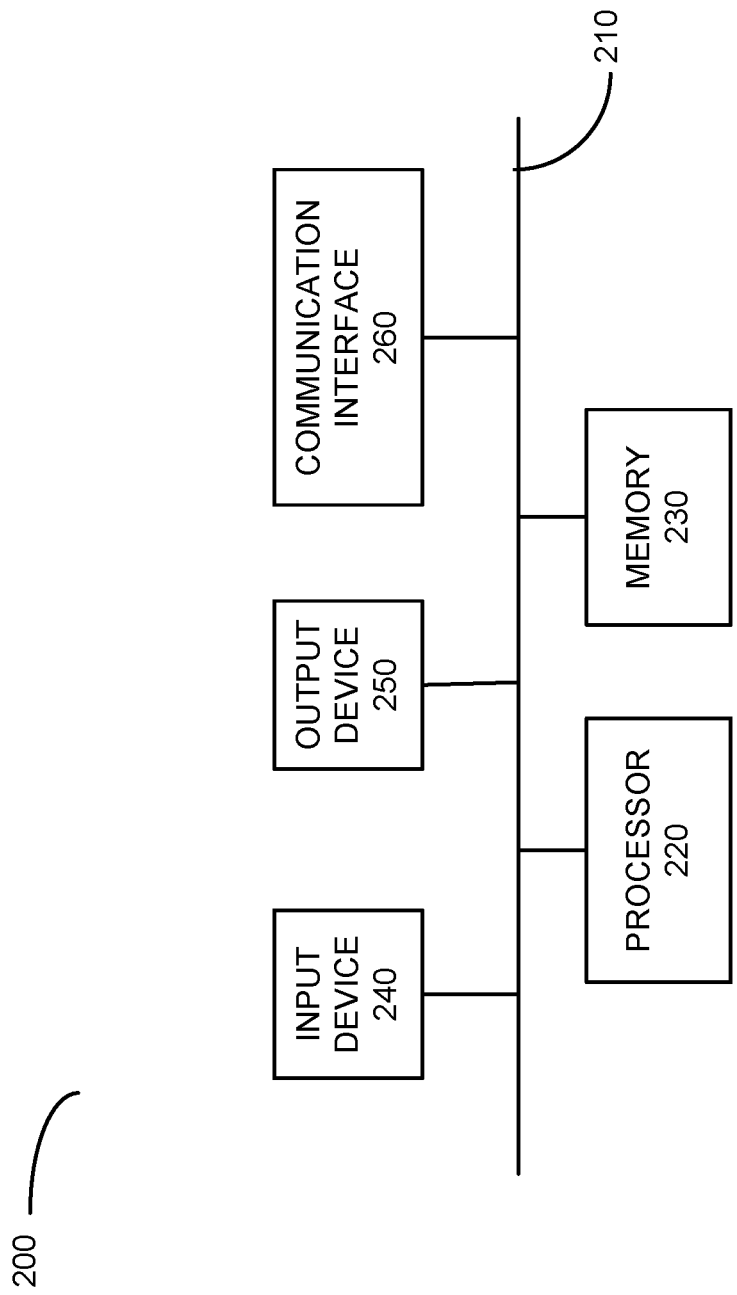
FIG. 2 illustrates an exemplary configuration of one or more of the components of FIG. 1.

FIG. 2 is a diagram of exemplary components of a device 200 that may correspond to user devices 102, P-CSCF 110, S-CSCF 120, I-CSCF 130, application server 140, HSS 150, provisioning system 160, or additional devices (not shown) in network 105. Each of user devices 102, P-CSCF 110, S-CSCF 120, I-CSCF 130, application server 140, HSS 150 and provisioning system 160 may include one or more devices 200. As shown in FIG. 2, device 200 may include a bus 210, a processor 220, a memory 230, an input device 240, an output device 250, and a communication interface 260.

Bus 210 may permit communication among the components of device 200. Processor 220 may include one or more processors or microprocessors that interpret and execute instructions. In other implementations, processor 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processor 220, a read only memory (ROM) or another type of static storage device that stores static information and instructions for the processor 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of network 105.

As described herein, device 200 may perform certain operations in response to processor 220 executing machine-readable instructions contained in a computer-readable medium, such as memory 230. A computer-readable medium may include a non-transitory memory device. A memory device may include space within a single physical memory device or spread across multiple physical memory devices. The machine-readable instructions may be read into memory 230 from another computer-readable medium or from another device via communication interface 260. The machine-readable instructions contained in memory 230 may cause processor 220 to perform processes described herein. Alternatively, hardwired circuitry may be used in place of or in combination with machine-readable instructions to implement processes described herein. Thus, implementations described herein are not limited to any specific combination of hardware circuitry and machine-readable instructions.

Figure 3:
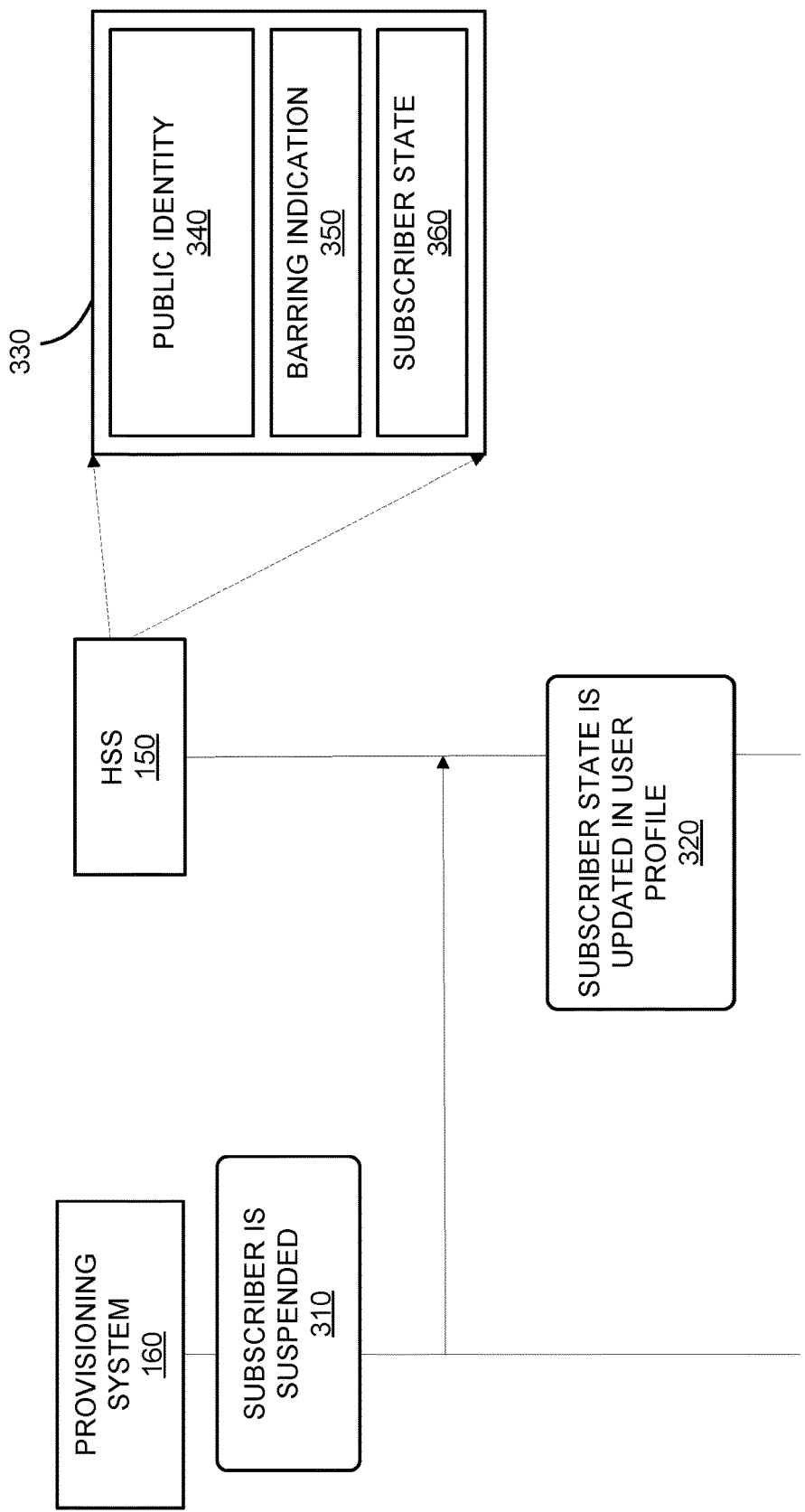
FIG. 3 illustrates a signal diagram of exemplary dialogs implementing a provisioning transaction that includes providing a subscription state to a home subscriber server (HSS)

FIG. 3 illustrates a signal diagram 300 of a provisioning transaction from provisioning system 160 to HSS 150 for a subscription state. As illustrated, signal diagram 300 may include signaling and transactions between provisioning system 160 and HSS 150. Additionally, signal diagram 300 includes determinations made at particular components of network 105. The signaling, transactions and determinations illustrated in FIG. 3 are for illustrative purposes only. Other signaling, transactions and determinations may be implemented. Therefore, signal diagram 300 may include additional, fewer and/or different components and/or transactions than those depicted in FIG. 3. Also, in some instances, one or more of the components of signal diagram 300 may perform one or more signaling, transactions or determinations described as being performed by another one or more of the components of signal diagram 300.

Provisioning system 160 may determine that a subscriber account is to be assigned an additional state (i.e., other than " " barred or "not barred") that requires processing via iFCs to provide conditional access to application servers 140 and network 105. In this instance, the subscriber account is to be placed in a suspended state (block 310). Additional states, other than barred or not barred, may be defined in iFCs and stored in HSS 150. In another example implementation, different sets of iFCs may be defined for each subscription-state. The additional states may include suspended, dormant, inactive, limited support, etc., and may be used to control subscriber access.

Usage of the additional subscription state within iFCs may allow service point triggers and application server addresses to be configured initially for different subscription states. The iFCs associated with the suspended state may allow limited non-emergency access to particular services and application servers 140. Provisioning system 160 may provide additional values corresponding to the particular additional subscription state, as described herein below with respect to FIG. 4.

In another example implementation, subscription-states may be provisioned (and/or managed) on per subscriber basis based on payment criteria or other factors. The subscription-state may be used as an index and iFCs may be defined within each subscription-state. In HSS 150, a different set of iFCs may be pre-defined on a per subscription-state basis. As subscription-state changes, new iFC-rules using subscription-state as index may be processed by S-CSCF 120. For additional processing after iFC processing at C-CSCF, subscription state may be passed to application servers 140 for subscription-state specific business logic. The general structure of the iFCs are similar to the iFC structures described above. However, instead of using subscription-states as part of a condition, the subscription states may be used as an index to identify a set of iFCs that will be processed.

The additional states may be defined in the IMS profile in HSS 150 and used by S-CSCF 120 for routing and filtering. Provisioning system 160 may pass the additional values associated with subscription states to the HSS 150 through the provisioning interface for each provisioning transaction, for example based on iFCs as described below with respect to FIG. 4. All IMS applications may be consistently updated based on the iFCs and values may be transmitted via the provisioning interface to HSS 150.

HSS 150 may store user profiles 330. User profile 330 may include a public identity 340, a barring indication 350 (as shown in FIG. 3, in this instance, false) and an enumerated subscription state (e.g., 0 may indicate active, 1 may indicate suspended, 2 may indicate dormant, 3 may indicate limited support, etc.). The subscription state may be updated in the user profile, as shown at block 320 via provisioning system 160.

Figure 4:
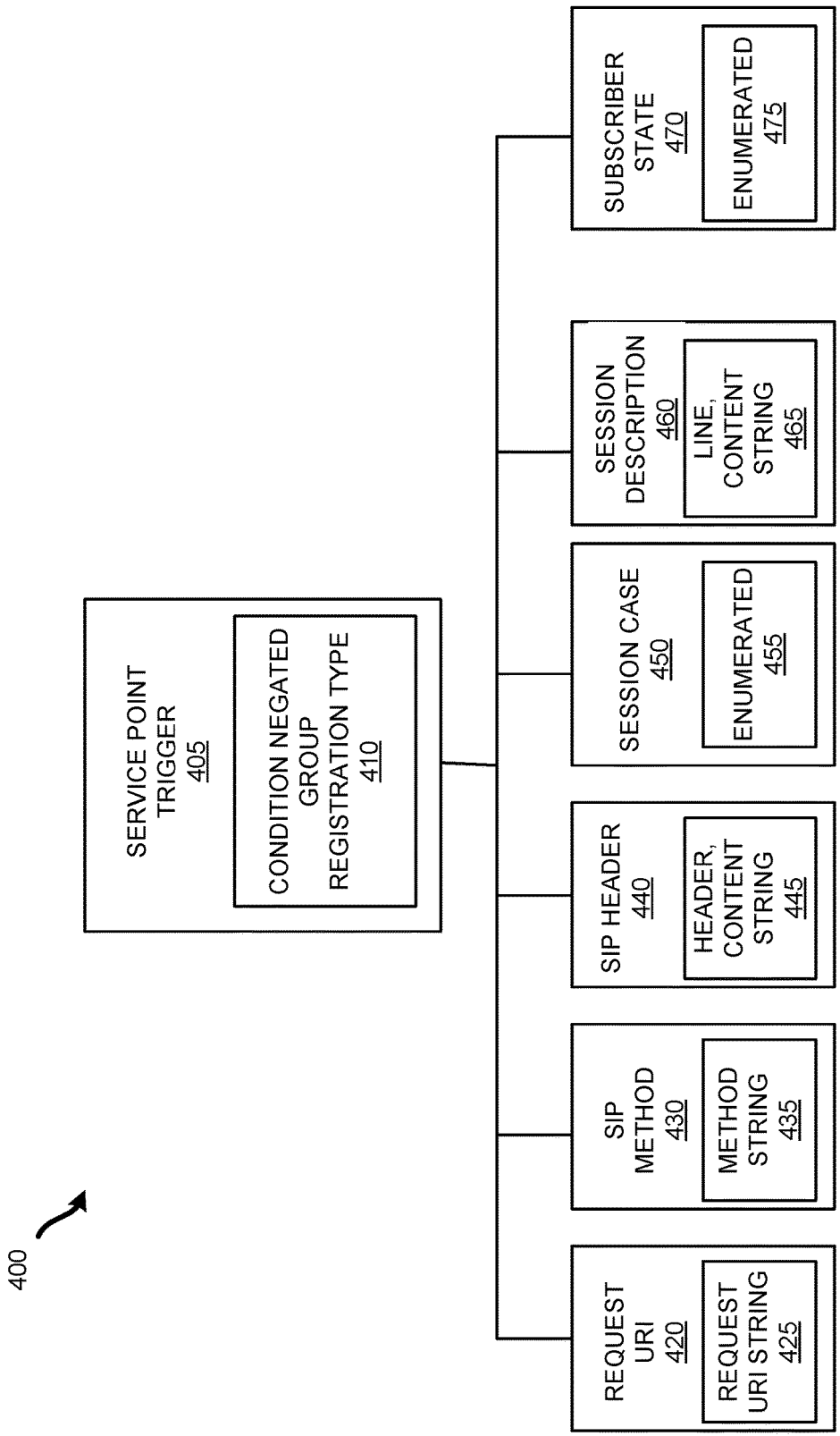
FIG. 4 illustrates fields of an initial filter criteria (iFC) including a subscription state field.

FIG. 4 illustrates an iFC definition 400. The iFC may include a service point trigger 405, a request uniform resource indicator (URI) 420, a SIP method 430, a SIP header field 440, a session case field 450, a session description field 460 and a subscription state field 470. In another example, subscription-state 470 can be used as part of service-point trigger 405 (or index) to identify the iFC that needs to be processed. iFC 400 may be used in routing sessions across different application servers 140 and restricting services provided in network 105.

As shown in FIG. 4, the service point trigger 405 may include one or more conditions that a session is required to meet in order to be routed to a specific application (i.e., a specific application server 140). Application server 140, HSS 150 and related entities in network 105 may provide support for inclusion of subscription state in iFC 400 processing as part of service point trigger definition. Service point trigger 405 may include fields 410 for condition negated, group and registration type. Condition type (in this instance, Boolean), defines the conditions that apply to the particular iFC and condition negated indicates whether a particular condition is negated. Group defines the group to which the subscriber belongs. Registration type includes a list of enumerated registration types. The iFCs 400 and service point trigger 405 provide support for inclusion of the subscription states in processing of iFCs based on a service point trigger definition Request URI 420 may provide a URI string (of variables) 425 for requests associated with particular iFCs. SIP method string 430 may include a string of SIP methods 435 associated with the session (e.g., INVITE, ACK, BYE, CANCEL, REGISTER, etc.). SIP header field 440 may include a string 445 of components of the request and response, such as a sender and recipient. Session case field 450 may enumerate 455 the particular session case associated with the communication. Session description field 460 may include a live content string 465 that may describe a particular communication session. Subscription state field 470 may identify a particular subscription state associated with the subscriber. Subscription state field 470 may include enumerated subscription states 475, such as dormant, suspended, inactive, etc.

The XML representation of the iFCs that include subscription states may include information such as an XML version (e.g., XML version="1.0"), encoding (e.g., Unicode transformation format version 8 ("UTF-8"?), IMS Subscription (e.g., IMS subscription xmlns:xsi=http://www.w3.org/2001/XMLSchema-instance), a private ID (e.g., PrivateID>IMPI1@homedomain.com/PrivateID>), a public ID (e.g., SIP:IMPU1@homedomain.com), Initial Filter Criteria (e.g., InitialFilterCriteria, including a trigger point, group, condition, method, etc.), an application server address (e.g., <ServerName> sip:AS1@homedomain.com</ServerName> <DefaultHandling index="0"> 0</DefaultHandling> <ServiceInformation>SubscriberState=1 </SubscriberState> </ApplicationServer>), etc.

The iFCs may be used to define the order that a session is routed across application servers 140 based on the subscription state associated with the subscriber user device 102 (or subscriber account).

Figure 5:
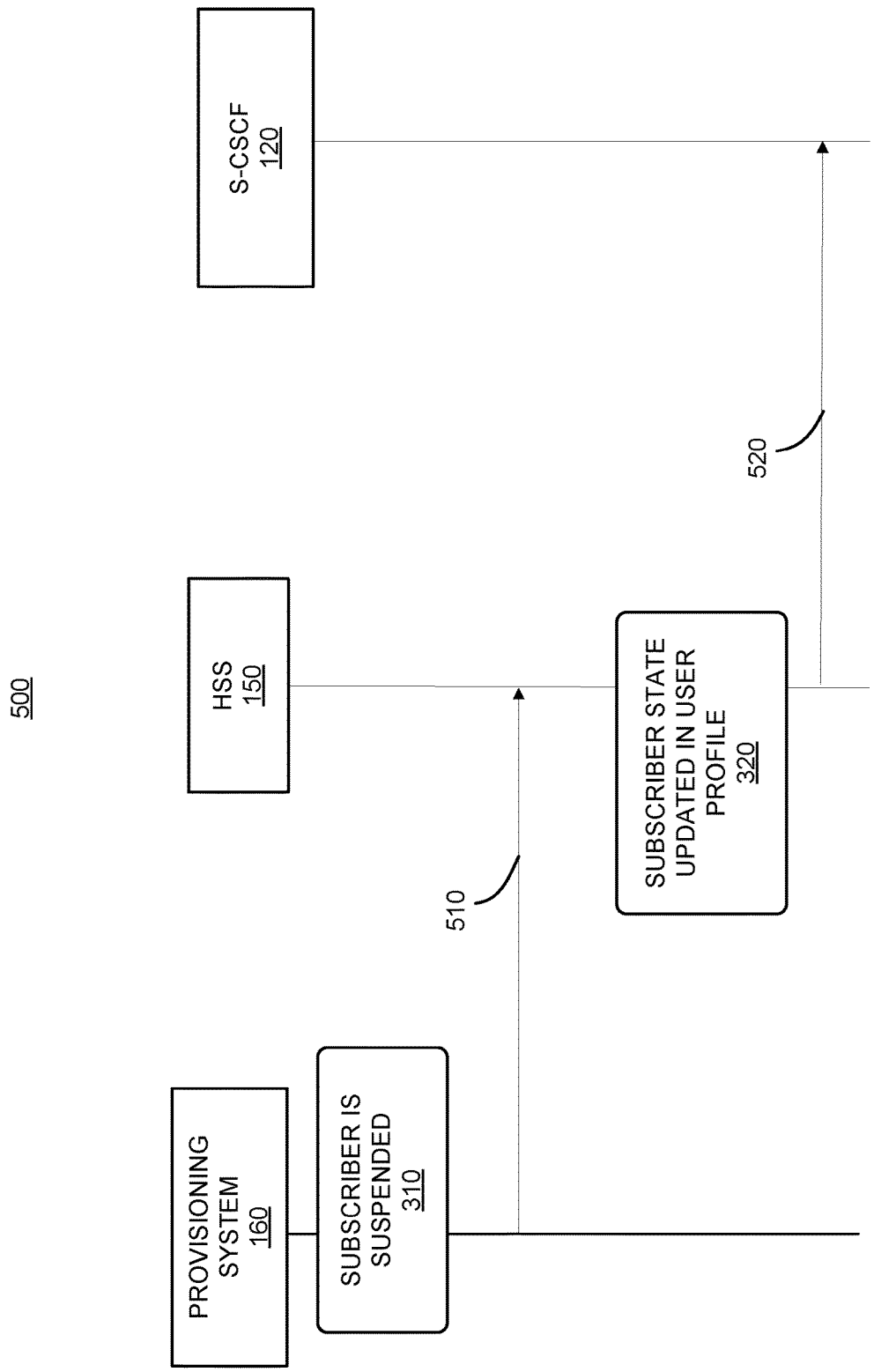
FIG. 5 is a signal diagram of exemplary dialogs implementing propagation of subscription state to S-CSCF based on iFCs included in the subscription state.

FIG. 5 includes a signal diagram 500 for propagating subscription state changes to S-CSCF 120 based on iFCs included in the subscription state. Signal diagram 500 includes provisioning system 160, HSS 150 and S-CSCF 120. The signaling, transactions and determinations illustrated in FIG. 5 are for illustrative purposes only. Other signaling, transactions and determinations may be implemented. Therefore, signal diagram 500 may include additional, fewer and/or different components and/or transactions than those depicted in FIG. 5. Also, in some instances, one or more of the components of signal diagram 500 may perform one or more signaling, transactions or determinations described as being performed by another one or more of the components of signal diagram 500.

As shown in FIG. 5, provisioning system 160 may receive an indication (or may determine) that a subscriber account has been suspended 310. For example, the subscriber account may be suspended in response to non-payment of bills, security measures, etc. Provisioning system 160 may generate a provisioning transaction 510 that provides a subscription state to HSS 150 based on the suspended state of the subscriber account.

In this instance the subscriber state may be a part of the iFC. iFC is defined to include different enumerations of subscriber states as conditions. The subscription state may be updated in the user profile (320). The subscription state may be included as part of public identity as part of the user profile stored at HSS 150. The subscription state may be pushed (520) to S-CSCF 120 based on a push profile request (PPR). The subscription state may be included (or referenced for routing) when S-CSCF 120 invokes application servers 140.

According to one embodiment, S-CSCF 120 may include the subscription state in the route header of messages when invoking application servers 140. The iFCs may be defined to include different enumerations of subscription states as conditions.

HSS 150 may be provisioned with the subscriber profile 330 including the iFCs. The current subscription state may also be provisioned in HSS 150. S-CSCF 120 may retrieve subscriber profile 330 from HSS 150 during user registration.

S-CSCF 120 may apply iFCs that include evaluation of current subscription state and routes SIP signaling of user device 102 accordingly to particular application servers 140. S-CSCF 120 may include subscription state indication in route header for signaling to the application servers 140.

Figure 6:
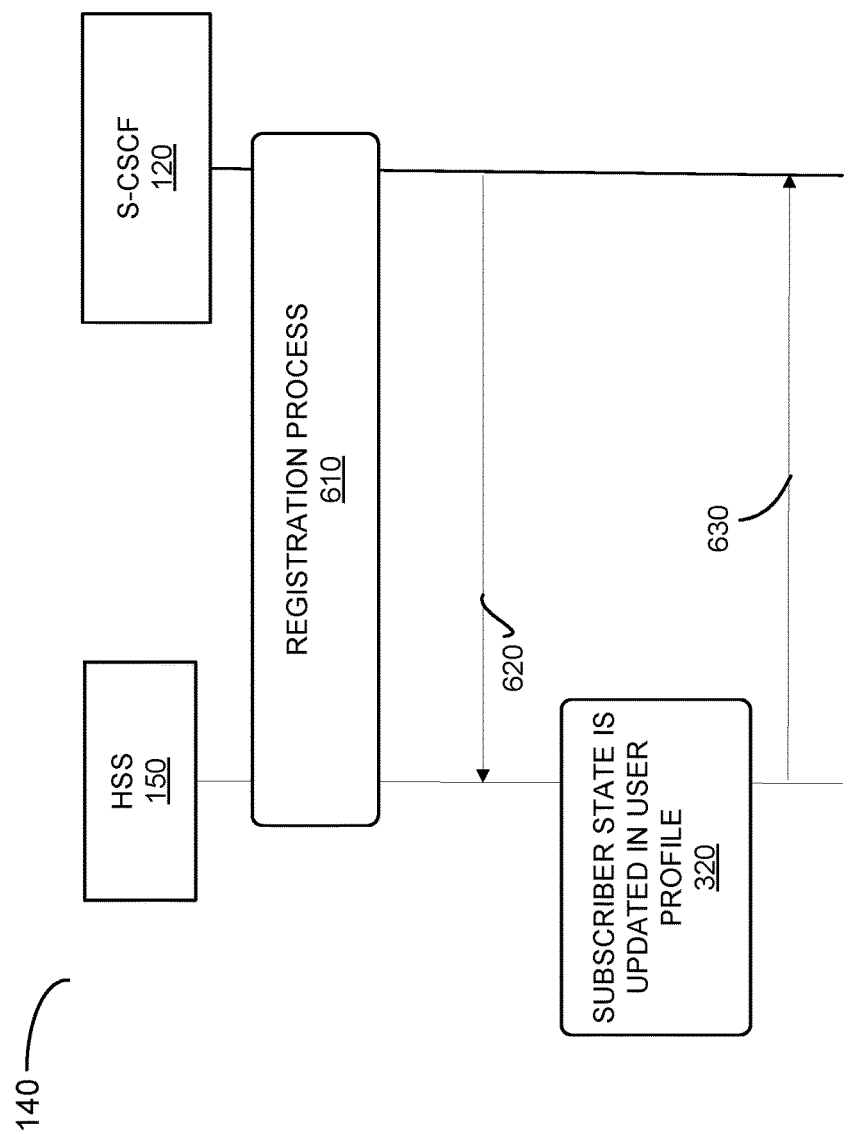
FIG. 6 is a signal diagram of exemplary dialogs implementing propagation of subscription state to S-CSCF during registration.

FIG. 6 illustrates a signal diagram 600 of exemplary dialogs for implementing propagating change to SCSCF during registration. As illustrated, signal diagram 600 may include signaling and transactions between S-CSCF 120 and HSS 150. Additionally, signal diagram 600 includes determinations made at particular components of network 105. The signaling, transactions and determinations illustrated in FIG. 6 are for illustrative purposes only. Other signaling, transactions and determinations may be implemented. Therefore, signal diagram 600 may include additional, fewer and/or different components and/or transactions than those depicted in FIG. 6. Also, in some instances, one or more of the components of signal diagram 600 may perform one or more signaling, transactions or determinations described as being performed by another one or more of the components of signal diagram 600.

As shown in FIG. 6, HSS 150 may interact with S-CSCF 120 to perform registration 610 of a user device 102. HSS 150 and S-CSCF 120 may perform a registration process that includes the subscriber status associated with user device 102. Subsequently, S-CSCF 120 may send a server assignment request (SAR) via Cx diameter interface to HSS 150. The Cx diameter interface connects call session control functions to HSS 150.

In instances in which the subscription state of a user device 102 changes, the systems may provide support for notification to S-CSCF 120 from HSS 150 in addition to "barred"/"unbarred" conditions. When the subscription state changes an alert may be generated by HSS 150 and sent to S-CSCF 120 (block 320). HSS 150 may send a server assignment answer (SAA) that includes the subscription state change to S-CSCF 120 using the Cx interface (block 630).

Upon receipt of a new SIP dialog for the subscriber, S-CSCF 120 may re-evaluate the iFC which includes evaluation of current subscription state. Hence, S-CSCF 120 may process the iFC accordingly and the message may be routed to appropriate application servers 140. Application severs 140 may process the request according to contents of the message and subscription state.

Figure 7:
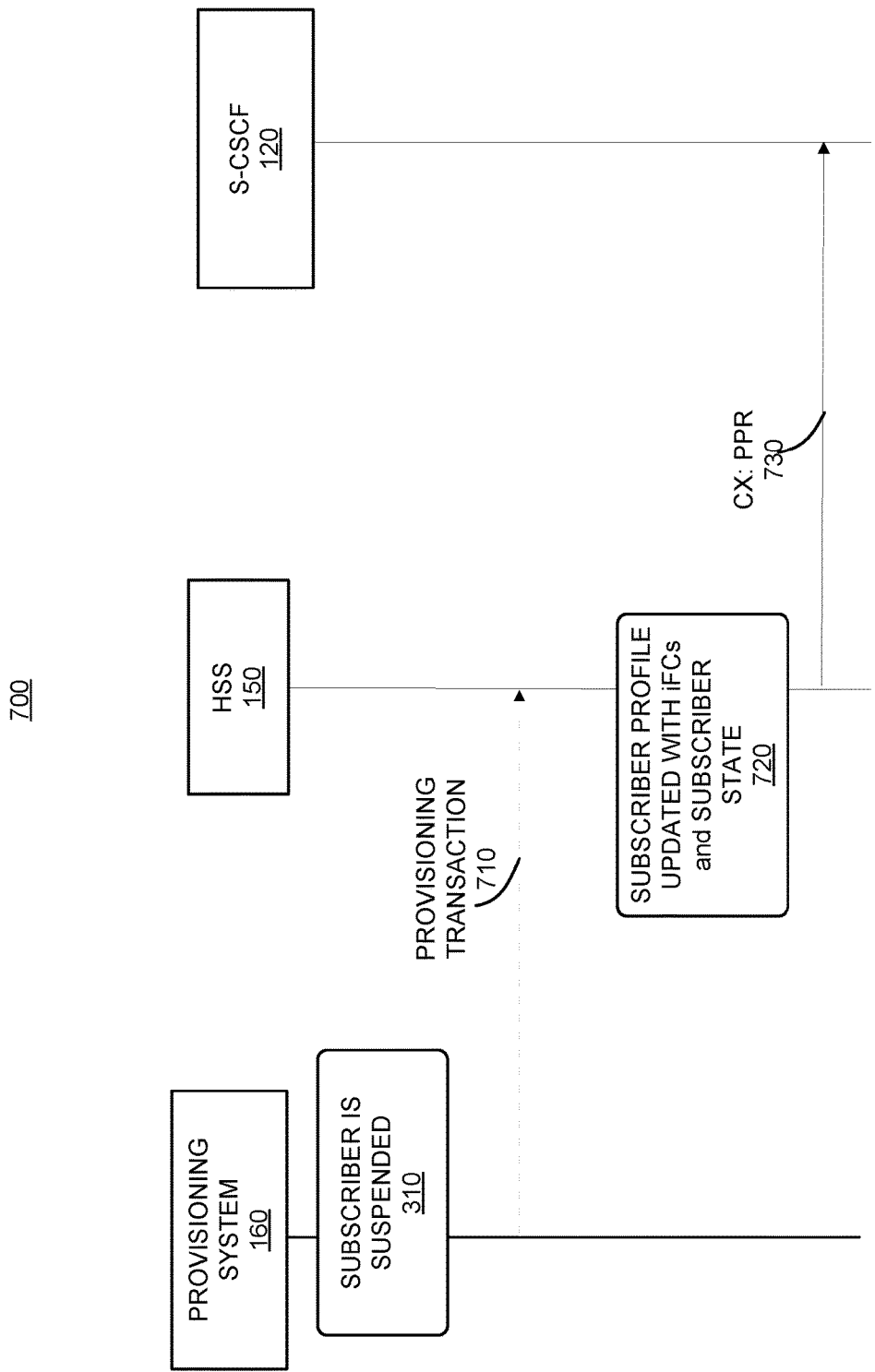
FIG. 7 is a signal diagram of exemplary dialogs implementing removal of P-subscription state when message traverses network boundaries.

FIG. 7 includes a call flow 700 for propagating subscription state changes to S-CSCF 120 based on separate iFC sets for different subscription states. Call flow 700 includes provisioning system 160, HSS 150 and S-CSCF 120. The signaling, transactions and determinations illustrated in FIG. 7 are for illustrative purposes only. Other signaling, transactions and determinations may be implemented. Therefore, signal diagram 700 may include additional, fewer and/or different components and/or transactions than those depicted in FIG. 7. Also, in some instances, one or more of the components of signal diagram 700 may perform one or more signaling, transactions or determinations described as being performed by another one or more of the components of signal diagram 700.

As shown in FIG. 7, communication and processing in call flow 700 may include separate iFC sets that are defined for different subscription states. HSS 150 may be provisioned with the subscriber profile including the iFCs. The current subscription state may also be provisioned in HSS 150. S-CSCF 120 may retrieve subscriber profile from HSS 150 during user registration.

S-CSCF 120 may apply iFC and route SIP signaling accordingly to application servers 140. S-CSCF 120 may include subscription state indication to application servers 140 in a SIP header called P-subscriber-state.

Provisioning system 160 may receive an indication (or may determine) that a subscriber account has been suspended 310. Provisioning system 160 may generate a provisioning transaction (710) that provides a subscription state to HSS 150 based on the suspended state of the subscriber account.

In response, HSS 150 may update the subscriber profile with iFCs and a subscription state (720). The subscription state may be included as part of public identity as part of the user profile stored at HSS 150. The subscription state may be pushed (730) to S-CSCF 120 via a state change command. Alternatively, the subscription state may be sent based on a push profile request (PPR) via Cx interface. After the state change, iFCs may be processed based on the new state S-CSCF 120 may use subscription-state in selecting the correct set of iFC and may change iFC-processing when subscription state changes. The public identity of the subscriber account may be placed (or maintained) in a not barred state based on the current subscription state of the subscriber account (i.e., based on whether the subscription state allows conditional non-emergency access). Upon receipt of a new SIP Dialog for the Subscriber, S-CSCF 120 may re-evaluate iFCs and route the message to appropriate application servers 140. S-CSCF 120 may divert service traffic to specific application servers 140 based on the new subscription state. S-CSCF 120 may include subscription state indication to application servers 140 in the P-subscriber-state SIP header.

Application servers 140 may process the request according to contents of the message and subscription state.

Figure 8:
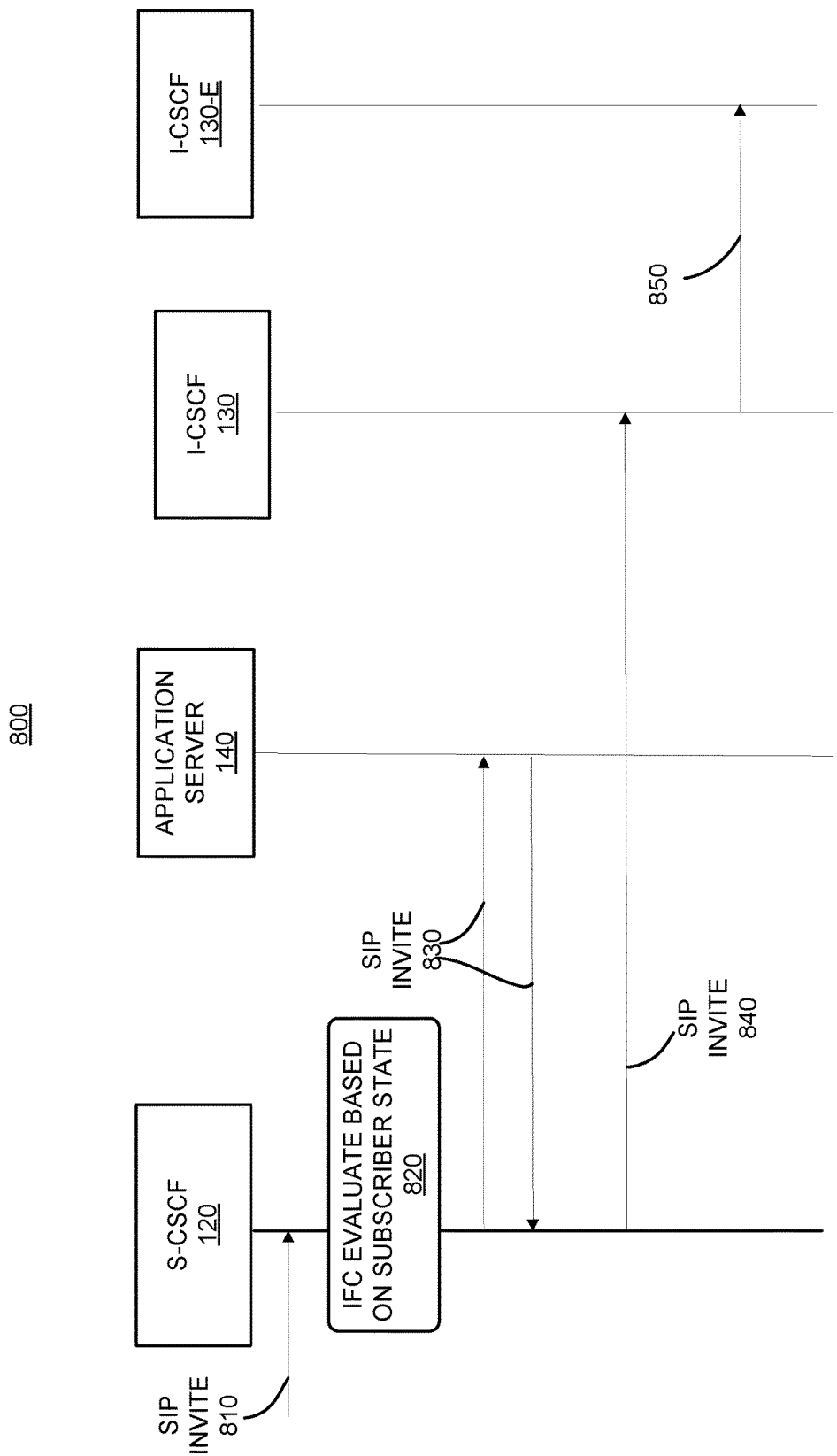
FIG. 8 is a signal diagram of exemplary dialogs implementing propagation of subscription state to S-CSCF based on separate iFC sets for different subscription state.

FIG. 8 is a signal diagram of exemplary dialogs for implementing removal of P-subscription state when messages traverse network boundaries. Call flow 800 includes S-CSCF 120, application server 140, I-CSCF 130 and I-CSCF 130-e. The signaling, transactions and determinations illustrated in FIG. 8 are for illustrative purposes only. Other signaling, transactions and determinations may be implemented. Therefore, signal diagram 800 may include additional, fewer and/or different components and/or transactions than those depicted in FIG. 8. Also, in some instances, one or more of the components of signal diagram 800 may perform one or more signaling, transactions or determinations described as being performed by another one or more of the components of signal diagram 800.

As shown in FIG. 8, S-CSCF 120 may receive an SIP invite 810. The SIP invite may be evaluated based on various criteria including subscription state (block 820). S-CSCF 120 may route to particular application servers 140 and receive SIP invite 830, including a SIP header, P-subscription state, that identifies the subscription state from application server 140. S-CSCF 120 may evaluate the IFCs associated with the particular subscription state. S-CSCF 120 may then send the SIP invite 840, which includes the P-subscription state, to I-CSCF 130.

I-CSCF 130 may remove the subscription state from the SIP invite prior to sending the SIP invite 850 out of the network 105. Subscription state indication may be removed when SIP message is routed to either UE or to external network. For example, in instances in which the SIP invite is sent to an external I-CSCF 130-e, I-CSCF 130 may remove any indication of the subscription state.

Figure 9:
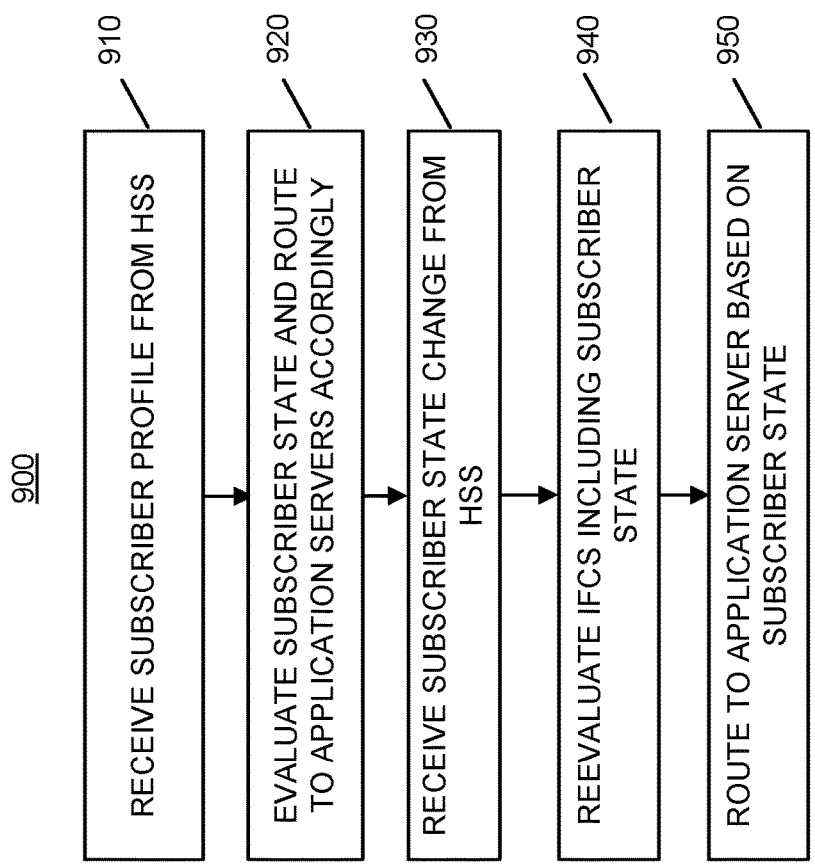
FIG. 9 is a flowchart of an exemplary process for providing service support for inactive and suspended subscribers.

FIG. 9 is a flowchart of an exemplary process 900 for providing service support for inactive and suspended subscribers. In one implementation, process 900 may be performed by S-CSCF 120. In another implementation, some or all of process 900 may be performed by another device or group of devices, including or excluding S-CSCF 120.

At block 910, S-CSCF 120 may retrieve subscriber profile from HSS 150 during user registration. HSS 150 may have previously been provisioned with the subscriber profile including iFCs that include the current subscription state.

S-CSCF 120 may apply iFCs that include an evaluation of the current subscription state and route SIP signaling accordingly to application servers (block 920) or apply subscription-state to use iFCs that need to be processed for a subscriber-state. S-CSCF may include subscription state indication to application servers 140 in route header or alternatively via a SIP private extension (i.e., using a SIP header P-subscriber-state).

At block 930, in instances that subscription state changes, S-CSCF 120 may receive subscription state change from HSS 150 using Cx: PPR (via a command). For example, in response to the subscriber account being suspended, HSS 150 may send the subscription state change to S-CSCF 120.

At block 940, upon receipt of a new SIP dialog for the subscriber, S-CSCF 120 may re-evaluate iFCs and route the message to appropriate application servers 140. More particularly, S-CSCF 120 may evaluate the current subscription state as part of the reevaluation of the iFCs.

S-CSCF 120 may process the iFCs and route the message to the appropriate application servers 140 (block 950). Application servers 140 may process the request according to contents of the message and subscription state. Subscription state indication may be removed when the SIP message is routed to either user device 102 or to an external network.

Systems and methods described herein may allow for the definition and usage of subscription states with iFCs so that service point triggers and application sever addresses may be initially configured for different subscription states. In instances in which a subscriber's state changes, the subscription state information may be propagated to S-CSCF 120 and any subsequent service access may be based on the iFCs that take into consideration the particular subscription state.

Systems and methods described herein may be applied in access technologies such as LTE, Enhanced High Rate Packet Data (eHRPD), Wi-Fi, Universal Terrestrial Radio Access Network (UTRAN), evolved UMTS (i.e., Universal Mobile Telecommunications System), evolved Universal Terrestrial Radio Access Network (EUTRAN), wireline access, fiber optic telecommunications, Internet/web access, etc. The system may be applied to a voice over Internet protocol (VoIP) service including at least one of a wireline and wireless user device 102.

The foregoing description provides illustration and description, but is not intended to be exhaustive or to limit the embodiments to the precise form disclosed. Modifications and variations are possible in light of the above teachings or may be acquired from practice of the invention. For example, while series of signal flows have been described with respect to FIG. 5 and series of acts have been described with regard to the flowcharts of FIGS. 7, 8 and 9, the order of the signals flows and acts may differ in other implementations. Further, non-dependent signal flows and acts may be performed in parallel.

Although embodiments described herein in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP standard are examples of protocols that may be used for establishing a communications session among terminals, such as user devices 102, connected to a network. Further, a combination of such protocols may be applied in various parts of the overall system. VoIP call (e.g., audio call, video call, etc.) is used above as an example to illustrate the embodiment, and other types of communication services/sessions, such as short message service (SMS), multimedia messaging service (MMS), rich communication suite (RCS) chat, File transfer, etc., may also be supported by this processes described herein.

Embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
   receiving, at a serving call session control function (S-CSCF) device, from a home subscriber server (HSS), a subscriber profile that includes a first subscription state associated with a user device, wherein the first subscription state is one of a plurality of subscription states in addition to barred and not barred, and wherein a set of initial filter criteria (iFC) is defined for each subscription state of the plurality of subscription states in the HSS;
   routing first messages to at least one of a plurality of application servers based on at least one iFC associated with the first subscription state;
   receiving, at the S-CSCF device and from the HSS, a subscription state change to a second subscription state, wherein the second subscription state is one of the plurality of subscription states;
   receiving one or more second messages from the user device;
   based on receiving the one or more second messages from user device, using the second subscription state as an index to identify at least one iFC, of the set of iFC defined for the second subscription state, associated with the second subscription state; and
   routing the one or more second messages to at least one of the plurality of application servers based on the at least one iFC associated with the second subscription state.

2. The computer-implemented method of claim 1, wherein the first subscription state comprises one of a dormant, suspended, inactive and limited support state.

3. The computer-implemented method of claim 1, wherein application server addresses associated with the plurality of application servers are configured for the first subscription state or the second subscription state.

4. The computer-implemented method of claim 1, wherein receiving the subscription state change to the second subscription state from the HSS further comprises:
   re-provisioning a subscriber account associated with the user device;
   setting a public identity of the subscriber account in a not barred state; and
   diverting service traffic to specific application servers of the plurality of application servers based on the second subscription state.

5. The computer-implemented method of claim 1, further comprising:
   including one of the plurality of subscription states in a public identity in a user profile of a subscriber account associated with the user device.

6. The computer-implemented method of claim 1, further comprising:

providing support for inclusion of the subscription states in processing of iFCs based on a service point trigger definition.

7. The computer-implemented method of claim 1, further comprising:
providing support for notification to the S-CSCF from the HSS in instances in which subscription state changes in addition to barred or not barred conditions.

8. The computer-implemented method of claim 1, further comprising:
using subscription-state in selecting a correct set of iFC; and
changing iFC processing in response to the subscription state change.

9. The computer-implemented method of claim 1, further comprising:
including the first subscription state or the second subscription state in a route header when invoking the application servers.

10. The computer-implemented method of claim 1, further comprising:
using a private SIP extension when invoking the application servers.

11. The computer-implemented method of claim 1, further comprising:
removing a subscription state indication when sending messages outside of a home network.

12. The computer-implemented method of claim 1, wherein the at least one iFC associated with the first subscription state or the at least one iFC associated with the second subscription state is defined to include different enumerations of subscriber states as conditions.

13. The computer-implemented method of claim 1, further comprising:
providing, via the plurality of application servers, appropriate protocol support for subscription-state processing; and
sending protocol compliant error/response messages back to the S-CSCF device based on subscription state.

14. A serving call session control function (S-CSCF) device comprising:
a memory to store a plurality of instructions; and
a processor configured to execute instructions in the memory to:
receive from a home subscriber server (HSS), a subscriber profile that includes a first subscription state associated with a user device, wherein the first subscription state is one of a plurality of subscription states in addition to barred and not barred, and wherein a set of initial filter criteria (iFC) is defined for each subscription state of the plurality of subscription states in the HSS;
route first messages to at least one of a plurality of application servers based on at least one iFC associated with the first subscription state;
receive, from the HSS, a subscription state change to a second subscription state from the HSS, wherein the second subscription state is one of the plurality of subscription states;
receive one or more second messages from the user device;
based on receiving the one or more second messages from the user device, use the second subscription state as an index to identify at least one iFC, of the set of iFC defined for the second subscription state, associated with the second subscription state; and
route the one or more second messages to at least one of the plurality of application servers based on the at least one iFC associated with the second subscription state.

15. The S-CSCF device of claim 14, wherein the first subscription state comprises one of a dormant, suspended, inactive and limited support state.

16. The S-CSCF device of claim 14, wherein application server addresses associated with the plurality of application servers are configured for the first subscription state or the second subscription state.

17. The S-CSCF device of claim 14, wherein, when receiving the subscription state change to the second subscription state from the HSS, the processor is further configured to:
re-provision a subscriber account associated with the user device;
set a public identity of the subscriber account in a not barred state; and
divert service traffic to specific application servers of the plurality of application servers based on the second subscription state.

18. The S-CSCF device of claim 14, wherein the processor is further configured to:
include one of the plurality of subscription states in a public identity in a user profile of a subscriber account associated with the user device.

19. The S-CSCF device of claim 14, wherein the processor is further configured to:
remove a subscription state indication when sending messages outside of a home network.

20. A non-transitory, computer-readable medium including instructions to be executed by a processor in a serving call session control function (S-CSCF) device, the instructions including one or more instructions, when executed by the processor, for causing the processor to:
receive from a home subscriber server (HSS), a subscriber profile that includes a first subscription state associated with a user device, wherein the first subscription state is one of a plurality of subscription states in addition to barred and not barred, and wherein a set of initial filter criteria (iFC) is defined for each subscription state of the plurality of subscription states in the HSS;
route first messages to at least one of a plurality of application servers based on at least one iFC associated with the first subscription state;
receive, at the S-CSCF device and from the HSS, a subscription state change to a second subscription state from the HSS, wherein the second subscription state is one of the plurality of subscription states;
receive one or more second messages from the user device;
based on receiving the one or more second messages from the user device, use the second subscription state as an index to identify at least one iFC, of the set of iFC defined for the second subscription state, associated with the second subscription state; and
route the one or more second messages to at least one of the plurality of application servers based on the at least one iFC associated with the second subscription state.

* * * * *